United States Patent
Tarleton

(10) Patent No.: US 9,008,221 B2
(45) Date of Patent: Apr. 14, 2015

(54) SPURIOUS FREQUENCY ATTENUATION SERVO

(71) Applicant: Honeywell International Inc., Morristown, NJ (US)

(72) Inventor: Norman Gerard Tarleton, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 262 days.

(21) Appl. No.: 13/854,574

(22) Filed: Apr. 1, 2013

(65) Prior Publication Data

US 2014/0294117 A1    Oct. 2, 2014

(51) Int. Cl.
*H04L 27/36* (2006.01)
*H04B 1/04* (2006.01)
*G06F 1/02* (2006.01)

(52) U.S. Cl.
CPC .............. *H04B 1/0475* (2013.01); *H04L 27/36* (2013.01); *G06F 1/022* (2013.01)

(58) Field of Classification Search
CPC ..... H04B 1/0475; H04B 1/0483; H04L 27/36
USPC .................... 375/294, 296, 376; 455/47, 109; 708/311, 271, 819; 331/1 A, 12, 76
See application file for complete search history.

(56) References Cited

U.S. PATENT DOCUMENTS

| | | |
|---|---|---|
| 4,673,293 A | 6/1987 | Sanders |
| 5,090,809 A | 2/1992 | Ferrar |
| 5,162,763 A * | 11/1992 | Morris .......................... 332/170 |
| 5,296,912 A | 3/1994 | Strandjord et al. |
| 5,327,214 A | 7/1994 | Asami |

(Continued)

FOREIGN PATENT DOCUMENTS

| | | |
|---|---|---|
| JP | H06235641 | 8/1994 |
| JP | H11108669 | 4/1999 |

(Continued)

OTHER PUBLICATIONS

Barbour, Neil M., "Inertial Navigation Sensors", "RTO-EN-SET-116(2008)", 2008, pp. 1-26, Publisher: NATO OTAN.

(Continued)

*Primary Examiner* — Joseph Chang
*Assistant Examiner* — Jeffrey Shin
(74) *Attorney, Agent, or Firm* — Fogg & Powers LLC

(57) ABSTRACT

A spurious frequency attenuation servo is provided. The spurious frequency attenuation servo includes a first function generator that generates a first signal at a first frequency and at a spurious frequency; a second function generator that generates a second signal in-phase with the first signal and at the spurious frequency; a third function generator that generates a third signal ninety degrees out-of-phase with the first signal and at the spurious frequency; in-phase and quadrature-phase mixers to input a feedback signal and the second and third signals, respectively; in-phase and quadrature-phase error accumulators; an in-phase and quadrature-phase multiplier to multiply an output from the in-phase and quadrature-phase error accumulators with the second and third signals, respectively; and a summing node to sum the first signal with output from the in-phase and quadrature-phase multipliers to form an output signal that is fed back to the in-phase mixer and the quadrature-phase mixer.

20 Claims, 6 Drawing Sheets

(56) References Cited

U.S. PATENT DOCUMENTS

| | | | |
|---|---|---|---|
| 5,469,257 A | 11/1995 | Blake et al. | |
| 5,563,705 A | 10/1996 | Sanders | |
| 5,627,644 A | 5/1997 | Sanders | |
| 6,204,921 B1 | 3/2001 | Strandjord et al. | |
| 6,429,939 B1 | 8/2002 | Bennett | |
| 6,445,455 B1 | 9/2002 | Hall et al. | |
| 6,670,861 B1 | 12/2003 | Balboni | |
| 6,675,630 B2 | 1/2004 | Challoner et al. | |
| 7,327,460 B2 | 2/2008 | Sanders et al. | |
| 8,294,900 B2 | 10/2012 | Strandjord et al. | |
| 8,634,512 B2 * | 1/2014 | Leung et al. | 375/376 |
| 8,699,034 B2 | 4/2014 | Strandjord et al. | |
| 2007/0097374 A1 | 5/2007 | Ren-Young | |
| 2008/0218764 A1 | 9/2008 | Chen | |
| 2009/0224953 A1 | 9/2009 | Seo et al. | |
| 2010/0002239 A1 | 1/2010 | Strandjord et al. | |
| 2010/0172168 A1 | 7/2010 | Fells | |
| 2010/0245834 A1 | 9/2010 | Strandjord | |
| 2012/0268191 A1 | 10/2012 | Ananthaswamy et al. | |

FOREIGN PATENT DOCUMENTS

| | | |
|---|---|---|
| JP | 2001066142 | 3/2001 |
| JP | 2002504234 | 2/2002 |
| JP | 2006292753 | 10/2006 |
| JP | 2010210616 | 9/2010 |
| WO | 9641129 | 12/1996 |
| WO | 0040926 | 7/2000 |

OTHER PUBLICATIONS

Wang, Xijing, "Digitalized Optical Ring Resonator Gyroscope Using Photonic Bandgap Fiber", "Thesis", Aug. 2008, pp. 1-75, Publisher: Department of Electronic Engineering, Graduate School of Engineering.

Yao et al., "FOG Source Error and Eliminating Analysis: Analysis on Light Source Intensity Noise and Noise Subtraction Method for Fib", "Laser Journal 2005", 2005, pp. 1-4, vol. 26, No. 5.

Ying et al., "Analysis of Kerr Effect in Resonator Fiber Optic Gyros With Triangular Wave Phase Modulation", "2010 Optical Society of America", Jan. 20, 2010, pp. 529-535, vol. 29, No. 3.

"1 GSPS Direct Digital Synthesizer with 14-Bit DAC: AD9912", Jun. 8, 2010, pp. 1-40, Publisher: Analog Devices, Inc.

* cited by examiner

SPURIOUS FREQUENCY ATTENUATION SERVO

BACKGROUND

Every frequency generator has distortion from nonlinearity in the electronics. Spur distortion in a function generator can cause problems. As defined herein, a "spur" is a spurious frequency in a signal. In some cases, the spur is a second harmonic of the fundamental frequency, which is the $1^{st}$ harmonic of the signal. In other cases, the spur is another harmonic of the fundamental frequency.

Prior art systems used to reduce unwanted spurs require a system user to manually adjust the phase and amplitude of any signal to cancel the spur. This process must be repeated manually as the system parameters change over time and the amplitude and frequency of the spurs change over time.

SUMMARY

The present application relates to a spurious frequency attenuation servo. The spurious frequency attenuation servo includes a first function generator that generates a first signal at a first frequency, the first signal including at least one spur at at least one respective spurious frequency; a second function generator that generates a second signal in-phase with the first signal and at a spurious frequency; a third function generator that generates a third signal ninety degrees out-of-phase with the first signal and at the spurious frequency; an in-phase mixer configured to input the second signal and a feedback signal; a quadrature-phase mixer configured to input the third signal and the feedback signal; an in-phase error accumulator configured to input the signal from the in-phase mixer; a quadrature-phase error accumulator configured to input the signal from the quadrature-phase mixer; an in-phase multiplier to multiply an output from the in-phase error accumulator with the second signal; a quadrature-phase multiplier to multiply an output from the quadrature-phase error accumulator with the third signal; and at least one summing node to sum the first signal, an output from the in-phase multiplier, and an output from the quadrature-phase multiplier to form an output signal that is fed back to the in-phase mixer and the quadrature-phase mixer. The at least one spurious frequency of the first signal is canceled from the first signal output from the summer.

DRAWINGS

In accordance with common practice, the various described features are not drawn to scale but are drawn to emphasize features relevant to the present invention. Like reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The embodiments of the spurious frequency attenuation servos described herein automatically generate a cancellation signal without manual adjustment by a user. The cancellation signal has the same magnitude and opposite polarity of the spurs to be canceled. The cancellation signal is at the frequency of one or more unwanted spurs and is automatically adjusted as the phase and/or magnitude of each unwanted spur shifts over time. In this manner, the spurs due to distortion from nonlinearity in the electronics of the function generator do not distort the desired signal. The term "spur" is also referred to herein as an "unwanted frequency". The spurious frequency attenuation servos cancel harmonics as well as other unwanted frequencies of a signal generated by a function generator. In one implementation of this embodiment, the spurious frequency attenuation servos cancel any signal at 60 Hz.

Figure 1:
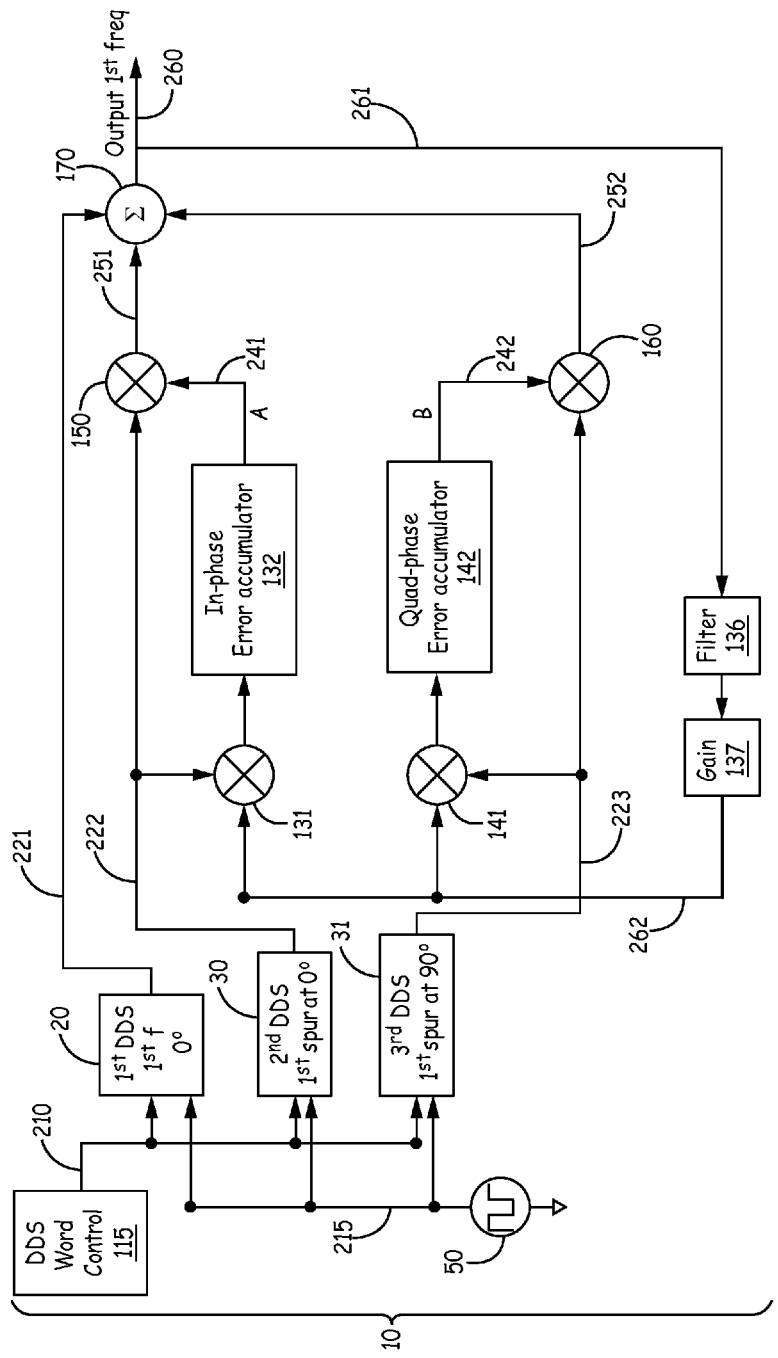
FIG. 1 is an embodiment of a spurious frequency attenuation servo in accordance with the present invention.

FIG. 1 is an embodiment of a spurious frequency attenuation servo 10 in accordance with the present invention. The spurious frequency attenuation servo 10 includes a first function generator 20, a second function generator 30, a third function generator 31, an in-phase mixer 131, a quadrature-phase mixer 141, an in-phase error accumulator 132, and a quadrature-phase error accumulator 142, an in-phase multiplier 150, a quadrature-phase multiplier 160, at least one summing node 170, a clock 50, a gain module 137, and a filter 136. The gain module 137 is also referred to herein as an amplifier 137. In one implementation of this embodiment, the filter 136 is a high-pass filter, which attenuates the large magnitude of the first signal that is output from the summing node 170, and which passes the spur signal to an amplifier 137. The amplifier 137 inputs the filtered signal and outputs an amplified spur signal as the feedback signal 262 to the in-phase mixer 131 and to the quadrature-phase mixer 141. In another implementation of this embodiment, the filter 136 is a band pass filter. In another implementation of this embodiment, the first function generator 20 and the second function generator 30 are direct digital synthesizers (DDS) although the spurious frequency attenuation servo 10 is operable with other types of function generators. In another implementation of this embodiment, all components except the clock 50, filter 136, and gain 137 are formed on a field programmable gate array (FPGA), an application specific integrated circuit (ASIC), or a mixed-signal ASIC.

In one implementation of this embodiment, the spurious frequency attenuation servo 10 also includes a DDS word control 115 (also referred to herein as a function generator word control 115) that is used during a calibration process (or during a recalibration process) to set the phase and frequency of the first function generator 20, the phase and frequency of the second function generator 30, and the phase and frequency of the third function generator 31. The function generator word control 115 is operable to set the first function generator 20 to the first frequency with 0 degree phase, to set the second function generator 30 to a spurious frequency with 0 degree phase, and to set the third function generator 31 to the spurious frequency with 90 degree phase.

First function generator 20 generates a first signal 221 at a first frequency. The first signal 221 includes at least one spur at a frequency other than the first frequency of the first function generator 20. As defined herein, the first frequency of the first signal 221 is the fundamental frequency generated by the first function generator 20. As defined herein, a spur is an unwanted signal at an unwanted frequency within a generated signal. Any frequencies other than the first frequency are referred to herein as spurious frequencies. Each of the spurs is at a respective spurious frequency that is offset from the first frequency.

Figure 2A:
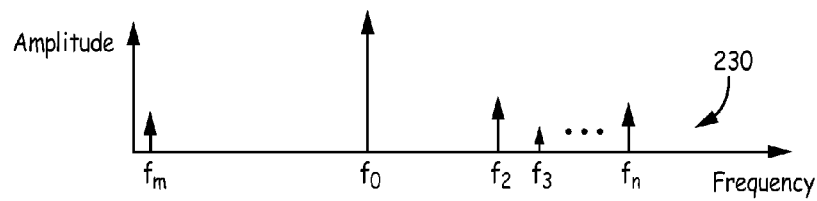
FIG. 2A shows frequencies of a first signal prior to operation of spurious frequency attenuation servo on the first signal.
Figure 2B:
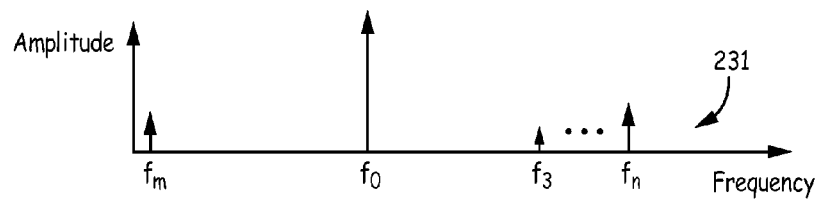
FIGS. 2B and 2C show frequencies of the first signal of FIG. 2A after operation of embodiments of the spurious frequency attenuation servo on the first signal.
Figure 2C:
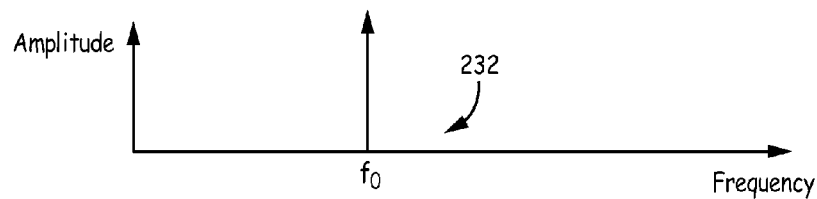

FIG. 2A shows exemplary frequencies contained in a first signal 221 prior to operation of spurious frequency attenuation servo 10 on the first signal 221. In FIGS. 2A-2C, the exemplary frequencies are represented generally as arrows distributed on the horizontal frequency axis. The frequencies of the first signal 221 represented generally as 230 prior to operation of the spurious frequency attenuation servo 10 is shown in FIG. 2A. The first frequency is indicated at frequency $f_0$. There are four exemplary spurious frequencies shown in FIG. 2A, which are referred to herein as first-spurious frequency $f_2$, second-spurious frequency $f_3$, third-spurious frequency $f_n$, and fourth-spurious frequency $f_m$ in FIG. 2A. The first signal 221 can have more or fewer spurious frequencies.

The clock 50 (FIG. 1) synchronizes the first, second, and third function generators 20, 30 and 40 with each other. The second function generator 30 generates a second signal 222 in-phase with the first signal 221 and at a spurious frequency. The third function generator 31 generates a third signal 223 ninety degrees out-of-phase with the first signal 221 and at the same spurious frequency generated at the second function generator 30. In one implementation of this embodiment, the spurious frequency is the first-spurious frequency $f_2$ shown in FIG. 2A. In another implementation of this embodiment, the spurious frequency $f_2$ shown in FIG. 2A is a second harmonic of the first frequency $f_0$, which is also referred to herein as the fundamental frequency $f_0$.

The in-phase mixer 131 inputs the second signal 222 and a feedback signal 262. The in-phase error accumulator 132 receives input from the first in-phase mixer 131 and outputs a signal to the in-phase multiplier 150. The in-phase multiplier 150 multiplies an output from the in-phase error accumulator 132 with the second signal 222.

The quadrature-phase mixer 141 inputs the third signal 223 and the feedback signal 262. The quadrature-phase error accumulator 142 receives input from the quadrature-phase mixer 141 and outputs a signal to the quadrature-phase multiplier 160. The quadrature-phase multiplier 160 multiplies an output from the quadrature-phase error accumulator 142 with the third signal 223.

The in-phase error accumulator 132 and quadrature-phase error accumulator 142 used in digital spurious frequency attenuation servos are digital accumulators, while the error accumulators 132 and 142 used in analog spurious frequency attenuation servos are integrators. When an integrator is used in the spurious frequency attenuation servo 10 to process an analog signal, the demodulator pulls information from a modulated signal (e.g., an error term) and the integrator then accumulates that information (e.g., the error). The feedback eventually nulls the error term to zero and then the integrator stops integrating. At that point, the output from the integrator is a value required to have zero error. In one implementation of this embodiment, other elements such as a low-pass filter and a gain stage are included in between the in-phase mixer 131 and in-phase error accumulator 132, and also included in between the quadrature-phase mixer 141 and the quadrature-phase error accumulator 142.

The summing node 170 sums the first signal 221, an output from the in-phase multiplier 150, and an output from the quadrature-phase multiplier 160. The output signal 260 is sent to a system that uses the first signal 221 with at least one spur signal removed. The output signal 260 output from the summing node 170 is sent as feedback signal 261 to the in-phase mixer 131 and the quadrature-phase mixer 141 via the filter 136 and the gain module 137. The feedback signal 261 is filtered and amplified and output from the gain module 137 as feedback signal 262. In this manner, the spur at the spurious frequency of the first signal 221 (e.g., at the fundamental frequency of the second function generator 30 and the third function generator 31) is canceled from the first signal 221 output from the summing node 170.

Figure 4:
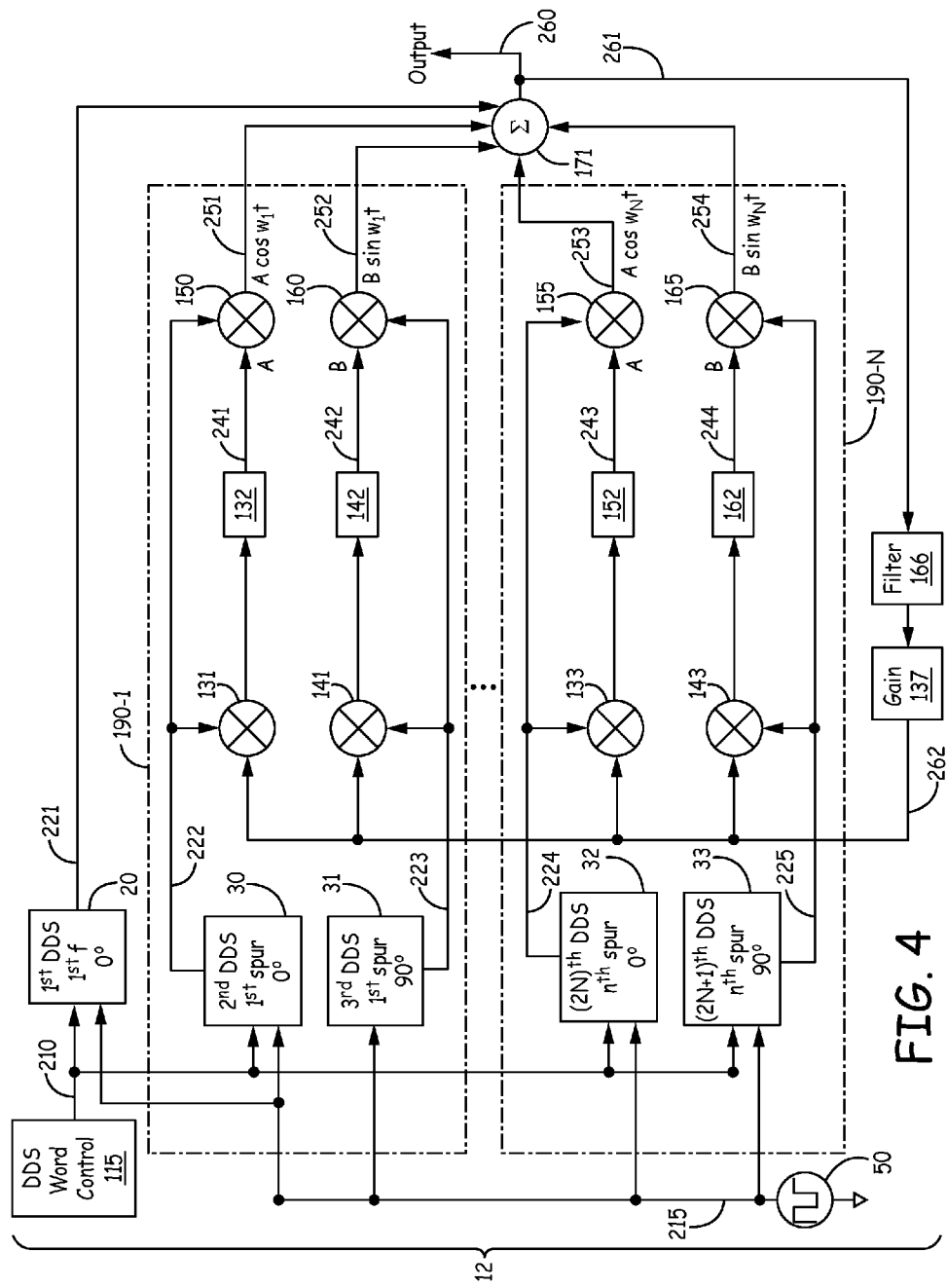
FIG. 4 is an embodiment of a spurious frequency attenuation servo to remove more than one spur from the first signal of FIG. 2A in accordance with the present invention.

FIGS. 2B and 2C show frequencies of the first signal 221 of FIG. 2A after operation of embodiments of the spurious frequency attenuation servo on the first signal 221. The frequencies of the first signal 221 represented generally as 231 after operation of the spurious frequency attenuation servo 10 is shown in FIG. 2B. As shown in FIG. 2B, the frequencies 231 of the first signal output from the summing node 170 of the spurious frequency attenuation servo 10 no longer include a spur at spurious frequency $f_2$. The spur signal at spurious frequency $f_2$ has been canceled since the fundamental frequency of the second function generator 30 and the third function generator 31 is at the frequency $f_2$. The frequencies of the first signal 221 represented generally as 232 after operation of the spurious frequency attenuation servo described below with reference to FIG. 4 is shown in FIG. 2C.

The spurious frequency attenuation servo 10 is a closed loop system that cancels a selected frequency (for example, a second harmonic) that would degrade the system receiving the first signal 221. The spurious frequency attenuation servo 10 is immune to drifts over time of the phase and magnitude of the spur in signal 221 generated by the first function generator 20. The spurious frequency attenuation servo 10 automatically corrects for shifts in the phase and magnitude of the spur in signal 221 and does not require a user to manually adjust a phase and/or magnitude of any of the function generators.

The spurious frequency attenuation servo 10 measures the magnitude and phase of the spur output from the first function generator 20 and corrects as needed. The signal 241 is output from the in-phase error accumulator 132 and is input to the in-phase multiplier 150. The signal 241 has a value equal to A, which represents the magnitude of the in-phase correction term. Likewise, the signal 242 is output from the quadrature-phase error accumulator 142 and is input to the quadrature-phase multiplier 160. The signal 242 has a value equal to B, which represents the magnitude of the quadrature-phase correction term.

The signal 251 is output from the in-phase multiplier 150 and is input to the summing node 170. The signal 252 is output from the quadrature-phase multiplier 160 and is input to the summing node 170. The signals 251 and 252 and the first signal 221 are summed at the summing node 170 to ensure that the selected spur is canceled at the output from the summing node 170.

Figure 3:
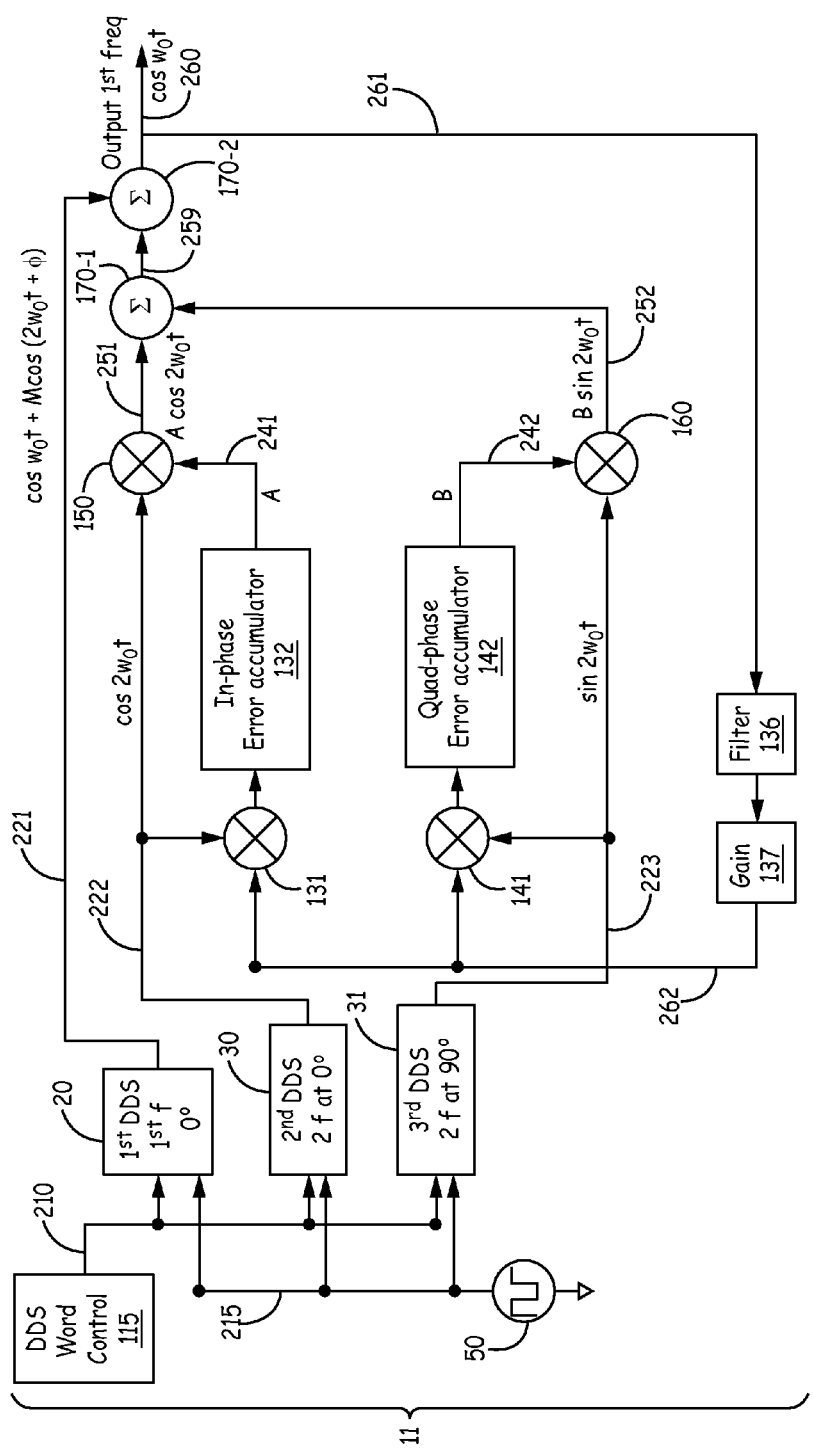
FIG. 3 is an embodiment of a spurious frequency attenuation servo in accordance with the present invention.

The manner in which the spurious frequency is canceled is more clearly understood with reference to FIG. 3. FIG. 3 is an embodiment of a spurious frequency attenuation servo 11 in accordance with the present invention. The spurious frequency attenuation servo 11 differs from the spurious frequency attenuation servo 10 of FIG. 1 in that the summing node 170 is shown as two separate summing nodes: a first summing node 170-1 and a second summing node 170-2.

When the signal 241 generated by the in-phase error accumulator 132 is zero and the signal 242 generated by the quadrature-phase error accumulator 142 is also zero, then the signal 261 output from summing node 170-2 is equal to the first signal 221 output from the first function generator 20. A zero output from the in-phase mixer 131 represents a zero in-phase error. Likewise, a zero output from the quadrature-phase mixer 131 represents a zero quadrature-phase error.

If the spur to be canceled in the first signal 221 generated by the first function generator 20 has an in-phase component as compared to the phase of the second signal 222 generated by the second function generator 30, the output of the in-phase mixer 131 is not zero. In this case, the in-phase error accumulator 132 accumulates the non-zero error and outputs a value "A" to represent the in-phase magnitude which is needed to set the in-phase mixer 131 output to zero.

Likewise, if the spur to be canceled in the first signal 221 generated by the first function generator 20 has a quadrature-phase component as compared to the phase of the third signal 223 generated by the third function generator 31, the output of the quadrature-phase mixer 141 is not zero. The quadrature-phase error accumulator 142 accumulates the non-zero error and outputs a value "B" to represent the quadrature-phase magnitude needed to set the quadrature-phase mixer 141 output to zero.

The exemplary case in which the spurious frequency $f_2$ is the second harmonic of the fundamental frequency $f_0$ is now discussed. The first signal 221 is mathematically represented as $\cos \omega_0 t + M \cos(2\omega_0 t + \phi)$, where $\omega_0 t = 2\pi f_0 t$ represents the first frequency, $2\omega_0 t$ represents the second harmonic frequency, $\phi$ is the phase of the second harmonic, and M is the magnitude of the second harmonic. At the in-phase multiplier 150, the second signal 222, which is mathematically described as $\cos 2\omega_0 t$, is amplified by "A". The signal 251 is output from the in-phase multiplier 150 and is input to the first summing node 170-1. The signal 251 equals $A \cos 2\omega_0 t$. At the quadrature-phase multiplier 160, the third signal 223, which is mathematically described as $\sin 2\omega_0 t$, is amplified by "B". The signal 252 is output from the quadrature-phase multiplier 160. The signal 252 equals $B \sin 2\omega_0 t$. The signal 252 is also input to the first summing node 170-1.

The output of the first summing node 170-1 is a correction signal 259 that equals:

$$A \cos(2\omega_0 t) + B \sin(2\omega_0 t) = (A^2+B^2)^{1/2}(\cos(2\omega_0 t - \tan^{-1}(B/A)). \quad (1)$$

The correction signal 259 is also referred to herein as a cancelation signal 259. In equation 1, the term $2\omega_0 t$ is the frequency of the correction signal 259 and the phase of the correction signal 259 is $\tan^{-1}(B/A)$. Thus, the phase of the correction signal 259 changes based on the value of "A" output from the in-phase error accumulator 132 and based on the value of "B" output from the quadrature-phase error accumulator 142. The amplitude $(A^2+B^2)^{1/2}$ of the correction signal 259 also changes based on the value of "A" output from the in-phase error accumulator 132 and based on the value of "B" output from the quadrature-phase error accumulator 142. Thus, the output of the summing node 170-1 has the appropriate phase [e.g., $\phi = \tan^{-1}(B/A)$] and the appropriate amplitude (e.g., $M = (A^2+B^2)^{1/2}$) to cancel the spur at the spurious frequency $2\omega_0 t$ of the first signal 221 [e.g., $\cos \omega_0 t + M \cos(2\omega_0 t + \phi)$].

As shown in FIG. 3, the correction signal 259 is summed with the first signal 221 at the second summing node 170-2. When the correction signal 259 and the first signal 221 are summed at the summing node 170-2, the spur mathematically represented as $M \cos(2\omega_0 t + \phi)$ on the first signal 221 is cancelled by the correction signal 259 mathematically represented as $(A^2+B^2)^{1/2}(\cos(2\omega_0 t - \tan^{-1}(B/A))$. In this manner, the output signal 260 from the second summing node 170-2 does not have any spur at the frequency $2\omega_0 t$. Specifically, the output signal 260 is mathematically represented as $\cos \omega_0 t$, which is solely the first frequency. The output signal 260 is provided as a feedback signal 261 to the filter 136. The amplified and filtered feedback signal 262 input to the in-phase mixer 131 and quadrature-phase mixer 141 is used to drive "A" and "B" to the values required for the magnitude and phase of the correction signal 259 to equal the magnitude and opposite phase of the spur signal to be canceled.

It is to be recognized that the same function provided by the summing node 170 of the spurious frequency attenuation servo 10 of FIG. 1 is provided by the first and second summing nodes 170-1 and 170-2 of the spurious frequency attenuation servo 11 of FIG. 3. The discussion with reference to FIGS. 1 and 3 can be applied to a spur that is not at the second harmonic of the fundamental frequency, by replacing "$2\omega_0 t$" with "$\omega_n t$", where $\omega_n = 2\pi f_n$ and $f_n$ is the spurious frequency of the spur to be canceled.

Prior art systems to cancel spur signals are not closed loop systems as are the embodiments of the systems described in this document. Prior art systems to cancel spur signals require manual adjustments over time by a user to cancel a spur signal as the phase and/or magnitude of the spur generated by the function generator drift over time.

FIG. 4 is an embodiment of a spurious frequency attenuation servo 12 to remove a plurality of spurs at a respective plurality of spurious frequencies from the first signal 221 in accordance with the present invention. The spurious frequency attenuation servo 12 cancels a plurality of spurs from the first signal 221 generated by the first function generator 20. The spurious frequency attenuation servo 12 includes a plurality of in-phase loops and quadrature-phase loops. The spurious frequency attenuation servo 12 includes a plurality of spur-cancelation subsystems represented generally as 190-1 and 190-N in FIG. 4, where N is a positive integer. Each spur-cancelation subsystem 190-1 through 190-N includes an in-phase loop and a quadrature-phase loop for a spurious frequency for one of the spurs in the first signal 221.

The spurious frequency attenuation servo 12 includes the first function generator 20, N spur-cancelation subsystems 190-1 through 190-N, a clock 50, and a summing node 171 that includes multiple inputs. In one implementation of this embodiment, the summing node 171 is a plurality of serially positioned summing nodes.

In an exemplary case, the N spur-cancelation subsystems 190-1 through 190-N cancel the spurs at spurious frequencies $f_2$ through $f_n$ shown in FIG. 2A. The frequencies of the first signal 221 represented generally as 232 after operation of such an exemplary spurious frequency attenuation servo 12 is shown in FIG. 2C. The first signal 221 output from the summation node 171 as output signal 260 of spurious frequency attenuation servo 12 has a signal at a single frequency $f_0$ and all the spurs have been canceled. In one implementation of this embodiment, the spurious frequency attenuation servo 12 includes less than N spur-cancelation subsystems 190-1 through 190-M (where M and N are positive integers and M<N) that cancel a subset of the spurs at spurious frequencies $f_2$ through $f_n$ shown in FIG. 2A.

As shown in FIG. 4, the second function generator 30, the third function generator 31, the in-phase mixer 131, the quadrature-phase mixer 141, the in-phase error accumulator 132, the quadrature-phase error accumulator 142, and the multipliers 150 and 160 form a first-spur-cancelation subsystem 190-1 in the spurious frequency attenuation servo 12. The first-spur-cancelation subsystem 190-1 functions to cancel a first spur at a first-spurious frequency $f_2$ from the first signal 221 output from the summation node 171. In the first-spur-cancelation subsystem 190-1, the in-phase DDS 30 and the quadrature-phase DDS 31 are set for the first-spurious frequency $f_2$ (FIG. 2A).

Similarly, as shown in FIG. 4, the $2N^{th}$ function generator 32, the $(2N+1)^{th}$ function generator 33, an $N^{th}$ in-phase mixer 133, an $N^{th}$ quadrature-phase mixer 143, an $N^{th}$ in-phase error accumulator 152, an $N^{th}$ quadrature-phase error accumulator 162, and multipliers 155 and 165 together form an $n^{th}$-spur-cancelation subsystem 190-N in the spurious frequency attenuation servo 12. The $n^{th}$-spur-cancelation subsystem 190-N functions to cancel an $n^{th}$ spur at the $n^{th}$-spurious frequency $f_n$ from the first signal 221 output from the summation node 171. In the $n^{th}$-spur-cancelation subsystem 190-N, an $N^{th}$ in-phase DDS 32 and an $N^{th}$ quadrature-phase DDS 33 are set for the $n^{th}$-spurious frequency $f_n$ (FIGS. 2A and 2B).

In one implementation of this embodiment, the spurious frequency of at least one of the spurs being canceled by the spurious frequency attenuation servo 12 is at a second harmonic of the first frequency (e.g., $f_0$). In another implementation of this embodiment, the spurious frequency of at least one of the spurs being canceled by the spurious frequency attenuation servo 12 is at a third harmonic of the first frequency (e.g., $f_0$). In yet another implementation of this embodiment, the spurious frequency of at least one of the spurs being canceled by the spurious frequency attenuation servo 12 is at a frequency that is less than the first frequency. For example, the spurious frequency of at least one of the spurs being canceled by the spurious frequency attenuation servo 12 is at 60 Hz. In yet another implementation of this embodiment, the components of the spurious frequency attenuation servo 12, except the clock 50, are formed in mixed-signal application-specific integrated circuits (ASIC).

The processes by which the spurious frequency attenuation servo 12 cancels two spurious frequencies is now described with reference to FIG. 4. The first signal 221 includes at least a first spur at a first-spurious frequency and a second spur at a second-spurious frequency. The second function generator 30 generates the second signal 222 in-phase with the first signal 221 and at the first-spurious frequency. The third function generator 31 generates the third signal 223 ninety degrees out-of-phase with the first signal 221 and at the first-spurious frequency. The fourth function generator 32 generates a fourth signal in-phase with the first signal 221 and at the second-spurious frequency. The fifth function generator 33 generates a fifth signal ninety degrees out-of-phase with the first signal 221 and at the second-spurious frequency.

The first-spur-cancelation subsystem 190-1 functions as described above with reference to FIG. 1. A second in-phase mixer 133 in the spur-cancelation subsystem 190-N inputs the feedback signal 262 and the fourth signal 224. A second quadrature-phase mixer 143 in the spur-cancelation subsystem 190-N inputs the feedback signal 262 and the fifth signal 225.

A first in-phase error accumulator 132 receives input from the first in-phase mixer 131 and to output a signal to the first in-phase multiplier 150. A first quadrature-phase error accumulator 142 receives input from the first quadrature-phase mixer 141 and to output a signal to the first quadrature-phase multiplier 160. A second in-phase error accumulator 152 receives input from the second in-phase mixer 133 and to output a signal to the second in-phase multiplier 155. A second quadrature-phase error accumulator 162 receives input from the second quadrature-phase mixer 143 and to output a signal to the second quadrature-phase multiplier 165.

The second in-phase multiplier 155 in the spur-cancelation subsystem 190-N multiplies an output 243 from the second in-phase error accumulator 152 with the fourth signal 224. The second quadrature-phase multiplier 165 in the spur-cancelation subsystem 190-N multiplies an output 244 from the second quadrature-phase error accumulator 162 with the fifth signal 225.

The summing node 171 sums the first signal 221 with outputs from the first in-phase multiplier 150, the first quadrature-phase multiplier 160, the second in-phase multiplier 155, and the second quadrature-phase multiplier 165 to form an output signal 260. The output signal 260 is sent to a system that uses the first signal 221 with at least two spur signals removed. The output signals 260 and 261 have no spurs at the first and second spurious frequencies. The output signal 260 is sent as a feedback signal 261 to the filter 166 and the gain module 137. In one implementation of this embodiment, the filter 166 is a bandpass filter. The amplifier 137 inputs the filtered signal and output an amplified signal 262 as the feedback signal 262 to the first and second in-phase mixers 131 and 133, respectively, and to the first and second quadrature-phase mixers 141 and 143, respectively.

The spurious frequency attenuation servo 12 includes a function generator word control 115 operable to: set the first function generator 20 to the first frequency with 0 degree phase; set the second function generator 30 to the first-spurious frequency with 0 degree phase; set the third function generator 31 to the first-spurious frequency with 90 degree phase; set the fourth function generator 32 to the second-spurious frequency with 0 degree phase; and set the fifth function generator 33 to the second-spurious frequency with 90 degree phase.

The spurious frequency attenuation servo 12 includes a clock 50 to synchronize the first function generator 20, the second function generator 30, the third function generator 31, the fourth function generator 32, and the fifth function generator 33 with each other.

Figure 5:
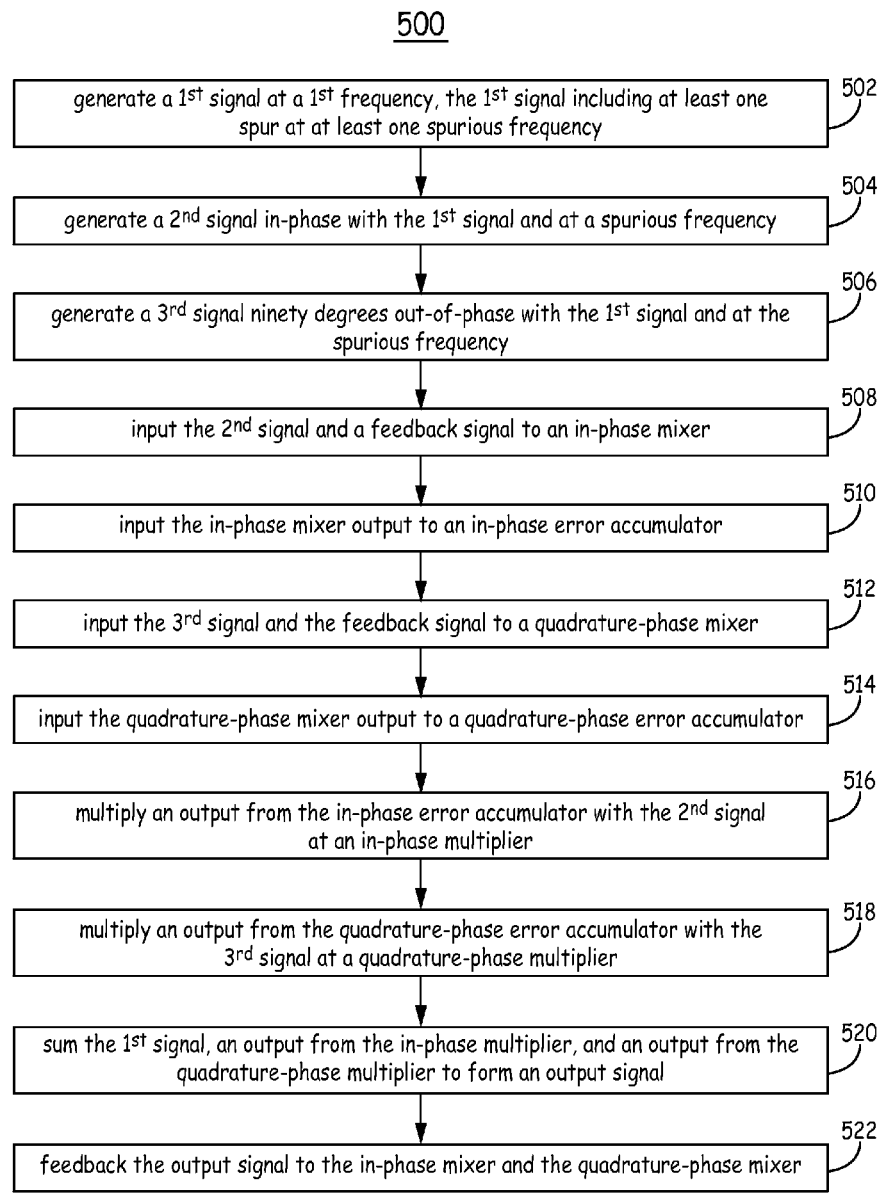
FIG. 5 is a method of cancelling one or more spurs in a spurious frequency attenuation servo in accordance with the present invention.

FIG. 5 is a method 500 of cancelling one or more spurs in a spurious frequency attenuation servo in accordance with the present invention. The embodiment of method 500 is described as being implemented using the spurious frequency attenuation servo 10 of FIG. 1. The method 500 is also applicable to the spurious frequency attenuation servo 12 of FIG. 4 as is understandable based on a reading of this document.

At block 502, a first signal 221 is generated at a first frequency. The first signal 221 includes at least one spur at at least one respective spurious frequency. At block 504, a second signal 222 is generated in-phase with the first signal 221 and at a spurious frequency. At block 506, a third signal 223 is generated ninety degrees out-of-phase with the first signal 221 and at the spurious frequency.

At block 508, the second signal 222 and a feedback signal 262 are input to an in-phase mixer 131. At block 510, the output of the in-phase mixer 131 is input to an in-phase error accumulator 132. At block 512, the third signal 223 and the feedback signal 262 are input to a quadrature-phase mixer 141. At block 514, the output of the quadrature-phase mixer 141 is input to a quadrature-phase error accumulator 142.

At block 516, an output from the in-phase error accumulator 132 is multiplied with the second signal 222 at an in-phase multiplier 150. At block 518, an output from the quadrature-phase error accumulator 142 is multiplied with the third signal 223 at a quadrature-phase multiplier 160.

At block 520, the first signal 221, an output 251 from the in-phase multiplier 150, and an output 252 from the quadrature-phase multiplier 160 are summed to form an output signal 260. At block 522, the output signal 261 is fed back to the in-phase mixer 131 and the quadrature-phase mixer 141, to cancel the spurious frequency from the first signal 221.

Before blocks 502-522 are implemented a calibration process is implemented in which the first function generator 20 is set to the first frequency with 0 degree phase; the second function generator 30 is set to the first-spurious frequency with 0 degree phase; and the third function generator 31 is set to the first-spurious frequency with 90 degree phase.

When method 500 is applied to the spurious frequency attenuation servo 12 of FIG. 4, the first signal 221 includes at least a first spur at a first-spurious frequency and a second spur at a second-spurious frequency. In this embodiment, an additional fourth signal 224 is generated in-phase with the first signal 221 and at the second-spurious frequency while a fifth signal 225 is generated ninety degrees out-of-phase with the first signal 221 and at the second-spurious frequency.

Figure 6:
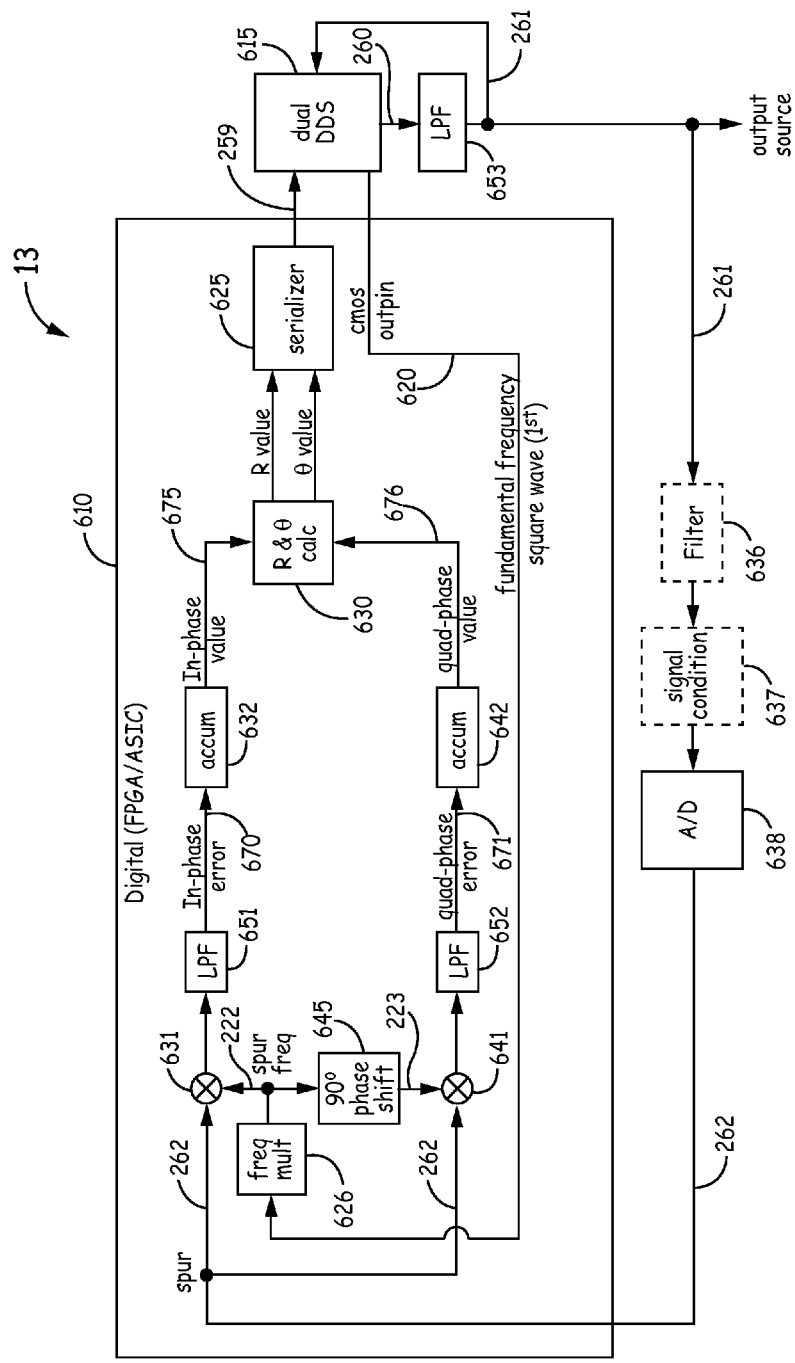
FIG. 6 is an embodiment of a spurious frequency attenuation servo in accordance with the present invention.

FIG. 6 is an embodiment of a spurious frequency attenuation servo 13 in accordance with the present invention. The spurious frequency attenuation servo 13 is a digital servo. In one implementation of this embodiment, the spurious frequency attenuation servo 13 is on a digital chip 610. In another implementation of this embodiment, the digital chip 610 is an ASIC 610. In yet another implementation of this embodiment, the digital chip 610 is a FPGA 610.

The spurious frequency attenuation servo 13 includes a dual direct digital synthesizer (DDS) 615, a low pass filter 653, an analog-to-digital converter (A/D) 638, a frequency multiplier 626, an in-phase mixer 631, an in-phase low pass filter 651, an in-phase error accumulator 632, a ninety-degree phase shifter 645, a quadrature-phase mixer 641, a quadrature-phase low pass filter 652, a quadrature-phase error accumulator 642, an R/θ module 630, and a serializer 625.

The dual DDS 615 includes two direct digital synthesizers (DDS), which perform the function of all three DDS 20, 30 and 31 of FIG. 3. The first DDS within the dual DDS 615, outputs a signal at the fundamental frequency with zero phase shift. The second DDS within the dual DDS 615, outputs a signal with frequency and magnitude equal to the frequency and magnitude of the spur to be cancelled. The phase of the signal output from the second DDS is opposite to the phase of the spur to be cancelled. The magnitude (R) and phase (θ) of the second DDS are adjusted using a serial port on the dual DDS 615. The output of the dual DDS is the summation of the first DDS and the second DDS within the dual DDS 615. The dual DDS 615 outputs a digitized signal 260, which is a digitized analog signal 260. The signal 620 (CMOS outpin) is a square wave signal 620 with a frequency equal to the fundamental frequency, which is equivalent to the signal output from the second summing node 170-2 in FIG. 3. The fundamental frequency is $f_0$ as described above.

The low pass filter 653 inputs the digitized signal 260 and outputs a reconstructed signal 261 that better represents a sine wave at the first frequency $f_0$. The low pass filter 653 also feeds back the reconstructed signal 261 to the dual DDS 615. The reconstructed signal 261 includes at least one spur at at least one respective spurious frequency as described above. The analog-to-digital converter 638 inputs the reconstructed signal 261 including at least one spur at at least one respective spurious frequency and sends output 262 to the in-phase mixer 631 and the quadrature-phase mixer 641. The A/D convertor 638 outputs the digital signal 262 containing the spur to canceled.

The frequency multiplier 626 inputs the square wave signal 620 from the dual DDS 615 and multiplies the fundamental frequency $f_0$ by N, where N is greater than 0 and is not necessarily an integer. In one implementation of this embodiment, the frequency multiplier 626 multiplies the fundamental frequency $f_0$ by two to generate a second harmonic frequency $2f_0$ of the fundamental frequency $f_0$. Other multiplicative values are possible. The frequency multiplied signal 222 output from the frequency multiplier 626 is at the spur frequency to be cancelled by the spurious frequency attenuation servo 13. The frequency multiplied signal 222 is referred to as a "spur frequency signal 222".

The spur frequency signal 222 is in-phase with the square wave signal 260 and at a spurious frequency as described above. The in-phase mixer 631 inputs (mixes) spur frequency signal 222 and the reconstructed signal 262 and sends output to the low pass filter (LPF) 651 operably positioned between the in-phase mixer 631 and the in-phase error accumulator 632. The low pass filter (LPF) 651 outputs signal 670. The in-phase error accumulator 632 inputs the signal 670 from the low pass filter 651. The in-phase error accumulator 632 outputs signal 675. The signal 675 has a value equal to A representing the magnitude of the in-phase correction term as described above.

The ninety-degree phase shifter 645 phase-shifts the multiplied-digitized signal 222 to generate a phase-shifted-multiplied-digitized signal 223. The phase-shifted-multiplied-digitized signal 223 is in quadrature-phase with the digitized signal 260 and at a spurious frequency as described above. The quadrature-phase mixer 641 inputs (mixes) the phase-shifted-multiplied-digitized signal 223 and the reconstructed signal 262. The quadrature-phase mixer 641 sends output to the low pass filter 652 operably positioned between the quadrature-phase mixer 641 and the quadrature-phase error accumulator 642. The low pass filter 652 outputs signal 671. The quadrature-phase error accumulator 642 inputs the signal 671 from the low pass filter 652. The quadrature-phase error accumulator 642 outputs signal 676. The signal 676 has a value equal to B representing the magnitude of the quadrature-phase correction term as described above.

The output from the in-phase error accumulator 632 and the quadrature-phase error accumulator 642 is processed by the R/θ module 630 and the serializer 625. Processed output from the in-phase error accumulator 632 and the quadrature-phase error accumulator 642 is fed back to the dual direct digital synthesizer 615 to cancel the at least one spur at the spurious frequency. Specifically, based on the input in-phase correction term A and quadrature-phase correction term B, the R/θ module 630 generates an R-value and a θ-value. The serializer 625 organizes the polar coordinate values input from the R/θ module 630 and outputs data 259 to the dual direct digital synthesizer 615.

In one implementation of this embodiment, a filter 636 inputs the reconstructed signal 261 and sends output to a signal conditioning module 637. The signal conditioning module 637 sends an output to the analog-to-digital convertor 638. In one implementation of this embodiment, the filter 636 is a band-pass filter. In another implementation of this embodiment, the filter 636 is a notch filter 636. If there is no filter 653 or 636 or signal conditioning unit 637, the analog signal 261 output from the LPF 653 is input directly to the A/D convertor 638.

As is understandable to one skilled in the art upon reading and understanding this document, more than one spurious frequency can be canceled by adding another path to cancel a second spurious frequency. In such an embodiment, an additional frequency multiplier multiplies the fundamental frequency by a factor that differs from the factor of the frequency multiplier 626 shown in FIG. 6.

The methods and techniques described here may be implemented in analog electronic circuitry, digital electronic circuitry, or with a programmable processor, firmware, software, or in combinations of them. Apparatus embodying these techniques may include appropriate input and output devices, a programmable processor, and a storage medium tangibly embodying program instructions for execution by the programmable processor. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs, or mixed-signal ASICs which contain analog and digital circuitry.

EXAMPLE EMBODIMENTS

Example 1 includes a spurious frequency attenuation servo, comprising: a first function generator that generates a first signal at a first frequency, the first signal including at least one spur at at least one respective spurious frequency; a second function generator that generates a second signal in-phase with the first signal and at a spurious frequency; a third function generator that generates a third signal ninety degrees out-of-phase with the first signal and at the spurious frequency; an in-phase mixer configured to input the second signal and a feedback signal; a quadrature-phase mixer configured to input the third signal and the feedback signal; an in-phase error accumulator configured to input the signal from the in-phase mixer; a quadrature-phase error accumulator configured to input the signal from the quadrature-phase mixer; an in-phase multiplier to multiply an output from the in-phase error accumulator with the second signal; a quadrature-phase multiplier to multiply an output from the quadrature-phase error accumulator with the third signal; and at least one summing node to sum the first signal, an output from the in-phase multiplier, and an output from the quadrature-phase multiplier to form an output signal that is fed back to the in-phase mixer and the quadrature-phase mixer, wherein the at least one spurious frequency of the first signal is canceled from the first signal output from the summer.

Example 2 includes the spurious frequency attenuation servo of Example 1, wherein the at least one spurious frequency includes a second harmonic of the first frequency.

Example 3 includes the spurious frequency attenuation servo of any of Examples 1-2, wherein the first signal includes at least a first spur at a first-spurious frequency and a second spur at a second-spurious frequency, wherein the in-phase mixer is a first in-phase mixer and the quadrature-phase mixer is a first quadrature-phase mixer, wherein the in-phase error accumulator is a first in-phase error accumulator and the quadrature-phase error accumulator is a first quadrature-phase error accumulator, wherein the in-phase multiplier is a first in-phase multiplier and the quadrature-phase multiplier is a first quadrature-phase multiplier, wherein the second function generator generates the second signal in-phase with the first signal and at the first-spurious frequency; the third function generator generates the third signal ninety degrees out-of-phase with the first signal and at the first-spurious frequency, the servo further comprising: a fourth function generator that generates a fourth signal in-phase with the first signal and at the second-spurious frequency; a fifth function generator that generates a fifth signal ninety degrees out-of-phase with the first signal and at the second-spurious frequency; a second in-phase mixer configured to input the feedback signal and the fourth signal; a second quadrature-phase mixer configured to input the feedback signal and the fifth signal; a second in-phase error accumulator configured to input the signal from the in-phase mixer; a second quadrature-phase error accumulator configured to input the signal from the quadrature-phase mixer; a second in-phase multiplier to multiply an output from the second in-phase error accumulator with the fourth signal; and a second quadrature-phase multiplier to multiply an output from the second quadrature-phase error accumulator with the fifth signal, wherein the at least one summing node is further configured to sum the first signal with an output from the second in-phase multiplier, and an output from the second quadrature-phase multiplier to form the output signal that is fed back to the second in-phase mixer and the second quadrature-phase mixer, and wherein the output signal has no spurs at the first and second spurious frequencies.

Example 4 includes the spurious frequency attenuation servo of Example 3, further comprising: a bandpass filter to input the signal output from the summing node and to output a filtered signal to an amplifier; and the amplifier to input the filtered signal and to output an amplified signal as the feedback signal to the first and second in-phase mixers and to the first and second quadrature-phase mixers.

Example 5 includes the spurious frequency attenuation servo of any of Examples 3-4, further comprising: a function generator word control to: set the first function generator to the first frequency with 0 degree phase; set the second function generator to the first-spurious frequency with 0 degree phase; set the third function generator to the first-spurious frequency with 90 degree phase; set the fourth function generator to the second-spurious frequency with 0 degree phase; set the fifth function generator to the second-spurious frequency with 90 degree phase.

Example 6 includes the spurious frequency attenuation servo of any of Examples 3-5, further comprising: a clock to synchronize the first, second, third, fourth and fifth function generators with each other.

Example 7 includes the spurious frequency attenuation servo of any of Examples 3-6, wherein the at least two spurs include a first spur at a second harmonic of the first frequency.

Example 8 includes the spurious frequency attenuation servo of any of Examples 1-7, further comprising: a high pass filter to input the signal from the summing node and to output a filtered signal to an amplifier; and the amplifier to input the filtered signal and to output an amplified signal as the feedback signal to the in-phase mixer and to the quadrature-phase mixer.

Example 9 includes the spurious frequency attenuation servo of any of Examples 1-8, further comprising: a function generator word control to set the first function generator to the first frequency with 0 degree phase, to set the second function generator to the spurious frequency with 0 degree phase, and to set the third function generator to the spurious frequency with 90 degree phase.

Example 10 includes the spurious frequency attenuation servo of any of Examples 1-9, further comprising: a clock to synchronize the first, second, and third function generators with each other.

Example 11 includes a method of cancelling one or more spurs in a spurious frequency attenuation servo, the method comprising: generating a first signal at a first frequency, the first signal including at least one spur at at least one respective spurious frequency; generating a second signal in-phase with the first signal and at a spurious frequency; generating a third signal ninety degrees out-of-phase with the first signal and at the spurious frequency; inputting the second signal and a feedback signal to an in-phase mixer; inputting the third signal and the feedback signal to a quadrature-phase mixer; inputting the in-phase mixer output to an in-phase error accumulator; inputting the quadrature-phase mixer output to a quadrature-phase error accumulator; multiplying an output from the in-phase error accumulator with the second signal at an in-phase multiplier; multiplying an output from the quadrature-phase error accumulator with the third signal at a quadrature-phase multiplier; summing the first signal, an output from the in-phase multiplier, and an output from the quadrature-phase multiplier to form an output signal; and feeding back the output signal to the in-phase mixer and the quadrature-phase mixer, to cancel the at least one spurious frequency from the first signal.

Example 12 includes the method of Example 11, wherein the first signal includes at least a first spur at a first-spurious frequency and a second spur at a second-spurious frequency, wherein generating the second signal in-phase with the first signal and at the spurious frequency comprises generating the second signal at the first-spurious frequency, wherein generating the third signal ninety degrees out-of-phase with the first signal and at the spurious frequency comprises generating the third signal at the first-spurious frequency, the method further comprising: generating a fourth signal in-phase with the first signal and at the second-spurious frequency; generating a fifth signal ninety degrees out-of-phase with the first signal and at the second-spurious frequency.

Example 13 includes the method of Example 12, wherein the in-phase mixer is a first in-phase mixer and the quadrature-phase mixer is a first quadrature-phase mixer, wherein the in-phase error accumulator is a first in-phase error accumulator and the quadrature-phase error accumulator is a first quadrature-phase error accumulator and, wherein the in-phase multiplier is a first in-phase multiplier and the quadrature-phase multiplier is a first quadrature-phase multiplier, the method further comprising: inputting the fourth signal and the feedback signal to a second in-phase mixer; inputting the fifth signal and the feedback signal to a second quadrature-phase mixer; inputting the signal from the second in-phase mixer output to a second in-phase error accumulator; inputting the signal from the second quadrature-phase mixer output to a second quadrature-phase error accumulator; multiplying an output from the second in-phase error accumulator with the fourth signal; and multiplying an output from the second quadrature-phase error accumulator with the fifth signal, wherein the summing further comprises summing outputs from the first, second, third, and fourth multipliers.

Example 14 includes the method of any of Examples 11-13, further comprising: setting the first function generator to the first frequency with 0 degree phase; setting the second function generator to a first-spurious frequency with 0 degree phase; and setting the third function generator to the first-spurious frequency with 90 degree phase.

Example 15 includes a spurious frequency attenuation servo, comprising: a dual direct digital synthesizer that generates a digitized signal and a square wave signal at a first frequency; a low pass filter to input the digitized signal and to output a reconstructed signal at the first frequency, the reconstructed signal including at least one spur at at least one respective spurious frequency; a frequency multiplier to multiply the square wave signal by a factor, wherein the frequency-multiplied-square wave signal is in-phase with the digitized signal and at a spurious frequency; an in-phase mixer configured to input the multiplied-digitized signal and the reconstructed signal; a ninety-degree phase shifter to phase-shift the multiplied-digitized signal; a quadrature-phase mixer configured to input the phase-shifted-frequency-multiplied signal and the reconstructed signal; an in-phase error accumulator configured to input the signal from the in-phase mixer; a quadrature-phase error accumulator configured to input the signal from the quadrature-phase mixer, wherein processed output from the in-phase error accumulator and the quadrature-phase error accumulator is fed back to the dual direct digital synthesizer to cancel the at least one spur at the spurious frequency.

Example 16 includes the spurious frequency attenuation servo of Example 15, further comprising: an R/θ module to convert the output from the in-phase error accumulator and the quadrature-phase error accumulator to polar coordinate values; a serializer to organize the polar coordinate values input from the R/θ module and to output data to the dual direct digital synthesizer.

Example 17 includes the spurious frequency attenuation servo of any of Examples 15-16, further comprising: an analog-to-digital convertor to input the reconstructed signal including at least one spur at at least one respective spurious frequency and to send output to the in-phase mixer and the quadrature-phase mixer.

Example 18 includes the spurious frequency attenuation servo of Example 17, further comprising: a filter to input the reconstructed signal and to send an output to a signal conditioning module; and the signal conditioning module to send an output to the analog-to-digital convertor.

Example 19 includes the spurious frequency attenuation servo of any of Examples 15-18, further comprising: an in-phase low pass filter operably positioned between the in-phase mixer and the in-phase error accumulator.

Example 20 includes the spurious frequency attenuation servo of any of Examples 15-19, further comprising: a quadrature-phase low pass filter operably positioned between the quadrature-phase mixer and the quadrature-phase error accumulator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:
1. A spurious frequency attenuation servo, comprising:
a first function generator that generates a first signal at a first frequency, the first signal including at least one spur at at least one respective spurious frequency;
a second function generator that generates a second signal in-phase with the first signal and at a spurious frequency;
a third function generator that generates a third signal ninety degrees out-of-phase with the first signal and at the spurious frequency;
an in-phase mixer configured to input the second signal and a feedback signal;
a quadrature-phase mixer configured to input the third signal and the feedback signal;

an in-phase error accumulator configured to input the signal from the in-phase mixer;
a quadrature-phase error accumulator configured to input the signal from the quadrature-phase mixer;
an in-phase multiplier to multiply an output from the in-phase error accumulator with the second signal;
a quadrature-phase multiplier to multiply an output from the quadrature-phase error accumulator with the third signal; and
at least one summing node to sum the first signal, an output from the in-phase multiplier, and an output from the quadrature-phase multiplier to form an output signal that is fed back to the in-phase mixer and the quadrature-phase mixer, wherein the at least one spurious frequency of the first signal is canceled from the first signal output from the summer.

2. The spurious frequency attenuation servo of claim 1, wherein the at least one spurious frequency includes a second harmonic of the first frequency.

3. The spurious frequency attenuation servo of claim 1, wherein the first signal includes at least a first spur at a first-spurious frequency and a second spur at a second-spurious frequency, wherein the in-phase mixer is a first in-phase mixer and the quadrature-phase mixer is a first quadrature-phase mixer, wherein the in-phase error accumulator is a first in-phase error accumulator and the quadrature-phase error accumulator is a first quadrature-phase error accumulator, wherein the in-phase multiplier is a first in-phase multiplier and the quadrature-phase multiplier is a first quadrature-phase multiplier, wherein
the second function generator generates the second signal in-phase with the first signal and at the first-spurious frequency;
the third function generator generates the third signal ninety degrees out-of-phase with the first signal and at the first-spurious frequency, the servo further comprising:
a fourth function generator that generates a fourth signal in-phase with the first signal and at the second-spurious frequency;
a fifth function generator that generates a fifth signal ninety degrees out-of-phase with the first signal and at the second-spurious frequency;
a second in-phase mixer configured to input the feedback signal and the fourth signal;
a second quadrature-phase mixer configured to input the feedback signal and the fifth signal;
a second in-phase error accumulator configured to input the signal from the in-phase mixer;
a second quadrature-phase error accumulator configured to input the signal from the quadrature-phase mixer;
a second in-phase multiplier to multiply an output from the second in-phase error accumulator with the fourth signal; and
a second quadrature-phase multiplier to multiply an output from the second quadrature-phase error accumulator with the fifth signal,
wherein the at least one summing node is further configured to sum the first signal with an output from the second in-phase multiplier, and an output from the second quadrature-phase multiplier to form the output signal that is fed back to the second in-phase mixer and the second quadrature-phase mixer, and wherein the output signal has no spurs at the first and second spurious frequencies.

4. The spurious frequency attenuation servo of claim 3, further comprising:
a bandpass filter to input the signal output from the summing node and to output a filtered signal to an amplifier; and
the amplifier to input the filtered signal and to output an amplified signal as the feedback signal to the first and second in-phase mixers and to the first and second quadrature-phase mixers.

5. The spurious frequency attenuation servo of claim 3, further comprising:
a function generator word control to:
set the first function generator to the first frequency with 0 degree phase;
set the second function generator to the first-spurious frequency with 0 degree phase;
set the third function generator to the first-spurious frequency with 90 degree phase;
set the fourth function generator to the second-spurious frequency with 0 degree phase;
set the fifth function generator to the second-spurious frequency with 90 degree phase.

6. The spurious frequency attenuation servo of claim 3, further comprising:
a clock to synchronize the first, second, third, fourth and fifth function generators with each other.

7. The spurious frequency attenuation servo of claim 3, wherein the at least two spurs include a first spur at a second harmonic of the first frequency.

8. The spurious frequency attenuation servo of claim 1, further comprising:
a high pass filter to input the signal from the summing node and to output a filtered signal to an amplifier; and
the amplifier to input the filtered signal and to output an amplified signal as the feedback signal to the in-phase mixer and to the quadrature-phase mixer.

9. The spurious frequency attenuation servo of claim 1, further comprising:
a function generator word control to set the first function generator to the first frequency with 0 degree phase, to set the second function generator to the spurious frequency with 0 degree phase, and to set the third function generator to the spurious frequency with 90 degree phase.

10. The spurious frequency attenuation servo of claim 1, further comprising:
a clock to synchronize the first, second, and third function generators with each other.

11. A method of cancelling one or more spurs in a spurious frequency attenuation servo, the method comprising:
generating a first signal at a first frequency, the first signal including at least one spur at at least one respective spurious frequency;
generating a second signal in-phase with the first signal and at a spurious frequency;
generating a third signal ninety degrees out-of-phase with the first signal and at the spurious frequency;
inputting the second signal and a feedback signal to an in-phase mixer;
inputting the third signal and the feedback signal to a quadrature-phase mixer;
inputting the in-phase mixer output to an in-phase error accumulator;
inputting the quadrature-phase mixer output to a quadrature-phase error accumulator;
multiplying an output from the in-phase error accumulator with the second signal at an in-phase multiplier;

multiplying an output from the quadrature-phase error accumulator with the third signal at a quadrature-phase multiplier;

summing the first signal, an output from the in-phase multiplier, and an output from the quadrature-phase multiplier to form an output signal; and feeding back the output signal to the in-phase mixer and the quadrature-phase mixer, to cancel the at least one spurious frequency from the first signal.

12. The method of claim 11, wherein the first signal includes at least a first spur at a first-spurious frequency and a second spur at a second-spurious frequency, wherein generating the second signal in-phase with the first signal and at the spurious frequency comprises generating the second signal at the first-spurious frequency, wherein generating the third signal ninety degrees out-of-phase with the first signal and at the spurious frequency comprises generating the third signal at the first-spurious frequency, the method further comprising:

generating a fourth signal in-phase with the first signal and at the second-spurious frequency;

generating a fifth signal ninety degrees out-of-phase with the first signal and at the second-spurious frequency.

13. The method of claim 12, wherein the in-phase mixer is a first in-phase mixer and the quadrature-phase mixer is a first quadrature-phase mixer, wherein the in-phase error accumulator is a first in-phase error accumulator and the quadrature-phase error accumulator is a first quadrature-phase error accumulator and, wherein the in-phase multiplier is a first in-phase multiplier and the quadrature-phase multiplier is a first quadrature-phase multiplier, the method further comprising:

inputting the fourth signal and the feedback signal to a second in-phase mixer;

inputting the fifth signal and the feedback signal to a second quadrature-phase mixer;

inputting the signal from the second in-phase mixer output to a second in-phase error accumulator;

inputting the signal from the second quadrature-phase mixer output to a second quadrature-phase error accumulator;

multiplying an output from the second in-phase error accumulator with the fourth signal; and multiplying an output from the second quadrature-phase error accumulator with the fifth signal, wherein the summing further comprises summing outputs from the first, second, third, and fourth multipliers.

14. The method of claim 11, further comprising:

setting the first function generator to the first frequency with 0 degree phase;

setting the second function generator to a first-spurious frequency with 0 degree phase; and setting the third function generator to the first-spurious frequency with 90 degree phase.

15. A spurious frequency attenuation servo, comprising:

a dual direct digital synthesizer that generates a digitized signal and a square wave signal at a first frequency;

a low pass filter to input the digitized signal and to output a reconstructed signal at the first frequency, the reconstructed signal including at least one spur at at least one respective spurious frequency;

a frequency multiplier to multiply the square wave signal by a factor, wherein the frequency-multiplied-square wave signal is in-phase with the digitized signal and at a spurious frequency;

an in-phase mixer configured to input the multiplied-digitized signal and the reconstructed signal;

a ninety-degree phase shifter to phase-shift the multiplied-digitized signal;

a quadrature-phase mixer configured to input the phase-shifted-frequency-multiplied signal and the reconstructed signal;

an in-phase error accumulator configured to input the signal from the in-phase mixer;

a quadrature-phase error accumulator configured to input the signal from the quadrature-phase mixer, wherein processed output from the in-phase error accumulator and the quadrature-phase error accumulator is fed back to the dual direct digital synthesizer to cancel the at least one spur at the spurious frequency.

16. The spurious frequency attenuation servo of claim 15, further comprising:

an R/θ module to convert the output from the in-phase error accumulator and the quadrature-phase error accumulator to polar coordinate values;

a serializer to organize the polar coordinate values input from the R/O module and to output data to the dual direct digital synthesizer.

17. The spurious frequency attenuation servo of claim 15, further comprising:

an analog-to-digital convertor to input the reconstructed signal including at least one spur at at least one respective spurious frequency and to send output to the in-phase mixer and the quadrature-phase mixer.

18. The spurious frequency attenuation servo of claim 17, further comprising:

a filter to input the reconstructed signal and to send an output to a signal conditioning module; and the signal conditioning module to send an output to the analog-to-digital convertor.

19. The spurious frequency attenuation servo of claim 15, further comprising:

an in-phase low pass filter operably positioned between the in-phase mixer and the in-phase error accumulator.

20. The spurious frequency attenuation servo of claim 19, further comprising:

a quadrature-phase low pass filter operably positioned between the quadrature-phase mixer and the quadrature-phase error accumulator.

* * * * *